United States Patent Office 3,304,306
Patented Feb. 14, 1967

3,304,306
N(AMIDINO-LOWER ALKYL)-BENZHYDRYL
PIPERIDINES
Lincoln Harvey Werner, Summit, Robert Paul Mull, Florham Park, Renat Herbert Mizzoni, Long Valley, and George de Stevens, Woodland Park, Summit, N.J., assignors to Ciba Corporation, New York, N.Y.
No Drawing. Filed Jan. 2, 1964, Ser. No. 335,374
8 Claims. (Cl. 260—293)

The present invention involves N-substituted N,N-alkylene-imine compounds. More particularly, it relates to N-(R-lower alkyl)-N,N-alkylene-imines, in which R is a substituent having the amidino moiety of the formula

and is attached through the carbon atom of the amidino moiety to the lower alkyl portion, and in which the alkylene-imine portion has from five to eight ring members, and one of its ring-carbon atoms is substituted by a group of the formula

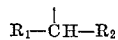

in which each of the groups $R_1$ and $R_2$ is a monocyclic aryl group, and salts thereof, as well as process for the preparation of such compounds.

In the compounds of this invention, the group R represents a group having the amidino moiety of the above formula, in which the carbon atom of the latter is connected through the lower alkyl portion to the ring-nitrogen atom of the N,N-alkylene-imine nucleus. The group R is preferably a group of the formula

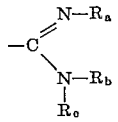

in which $R_a$ is hydrogen, lower alkyl, hydroxyl or acyloxy, $R_b$ is hydrogen, lower alkyl, acyl, or, when taken together with $R_a$, lower alkylene separating the two nitrogen atoms by at least two carbon atoms, and $R_c$ is hydrogen or lower alkyl. The nitrogen atoms of the amidino moiety are, therefore, unsaturated or each of them may be substituted by lower alkyl, e.g. methyl, ethyl, n-propyl, isopropyl and the like. Furthermore, the two nitrogen atoms may be linked together through a lower alkylene radical, which separates them by at least two, preferably by two to three, carbon atoms; lower alkylene radicals of this type are 1,2-ethylene, 1-methyl-1,2-ethylene, 2-methyl-1,2-ethylene, 1,3-propylene, 1-methyl-1,3-propylene, 2,3-butylene and the like. In addition, the imino-nitrogen may be substituted by a hydroxyl group of an acyloxy group, in which acyl is particularly the acyl radical of an organic carboxylic acid, for example, an aliphatic carboxylic acid, such as a lower alkanoic acid, e.g. acetic, propionic acid and the like, or an aryl carboxylic acid, e.g. benzoic, nicotinic acid and the like. The amino-nitrogen of the amidino moiety may also be substituted by an acyl group, particularly the acyl radical of an organic carboxylic acid, such as one of those previously mentioned.

The group R is connected to the imino-nitrogen of the N,N-alkylene-imine portion through a lower alkylene radical, having preferably from one to three carbon atoms. Such radical is represented above all by methylene, as well as 1,1-ethylene, 1,2-ethylene, 1-methyl-1,2-ethylene, 2-methyl-1,2-ethylene, 1,3-propylene and the like.

Apart from the group of the formula

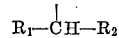

the carbon atoms of the N,N-alkylene-imine system, representing above all a piperidine nucleus, as well as a pyrrolidine, a hexahydro-azepine or an octahydro-azocine nucleus, are unsubstituted or may contain other substituents, such as lower alkyl, e.g. methyl, ethyl, n-propyl and the like.

In the substituent

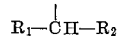

each of the groups $R_1$ and $R_2$ is a monocyclic carbocyclic aryl radical, i.e. phenyl or phenyl substituted by one or more than one of the same or of different substituents attached to any of the positions available for substitution; suitable substituents are lower alkyl, e.g. methyl, ethyl, n-propyl, isopropyl, n-butyl and the like, lower alkoxy, e.g. methoxy, ethoxy, n-propyloxy, isopropyloxy, n-butyloxy and the like, halogeno, e.g. fluoro, chloro, bromo and the like, trifluoromethyl or any other equivalent substituent. Preferred monocyclic carbocyclic aryl groups representing $R_1$ and/or $R_2$ are phenyl, (lower alkyl)-phenyl, (lower alkoxy)-phenyl, (halogeno)-phenyl, (trifluoromethyl)-phenyl and the like.

Salts of the compounds of this invention are acid addition salts, primarily pharmaceutically acceptable, non-toxic acid addition salts with pharmaceutically acceptable acids, particularly inorganic acids, e.g. hydrochloric, hydrobromic, nitric, sulfuric, phosphoric acids and the like, or organic acids, such as organic carboxylic acids, e.g. acetic, malonic, succinic, maleic, hydroxy-maleic, fumaric, malic, tartartic, citric, benzoic, nicotinic, isonicotinic acid and the like, or organic sulfonic acids, e.g. methane sulfonic, ethane sulfonic, 2-hydroxyethane sulfonic, ethane 1,2-disulfonic, p-toluene sulfonic, naphthalene 2-sulfonic acid and the like. Acid addition salts may also serve as intermediates, for example, in the purification of the free compounds or for the preparation of other acid addition salts, or for identification and characterization purposes. Particularly useful for the latter are salts with acidic organic nitro compounds, e.g. picric, picrolonic, flavianic acid and the like, or with metal complex acids, e.g. phosphotungstic, phosphomolybdic, chloroplatinic, Reinecke acid and the like.

The compounds of this invention may be obtained in the form of mixtures of isomers or of single isomeric compounds.

The compounds of the present invention, which are preferably represented by the following structural formula

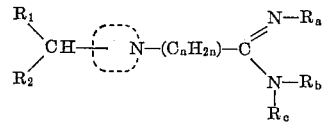

in which $R_1$, $R_2$, $R_a$, $R_b$ and $R_c$ have the previously-given meaning, and the group of the formula

is an N,N-alkylene-imino group having from five to eight ring members, in which one of its ring-carbon atoms is substituted my the group of the formula

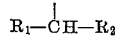

and in which the group of the formula —$(C_nH_{2n})$— is lower alkylene, or salts thereof, cause a marked decrease of the gastric secretion of hydrochloric acid. This pharmacological effect is demonstrated by a test using the Pavlov pouch dog, in which gastric secretion is stimulated by feeding a meat meal, as well as with a test using dogs with gastric fistulae, in which gastric secretion is induced by histamine. In both of these tests, the compounds of the present invention, which are orally active, cause a decrease of the gastric secretion. The compounds of this invention are, therefore, useful in the management and treatment of gastric irritation or gastric ulcers by reducing the amount of free hydrochloric acid in the stomach. They are also useful as research tools in the study of the mechanism of gastric secretion of hydrochloric acid.

Particularly useful are the 1-(R'-lower alkyl)-piperidines, in which R' is the group of the formula

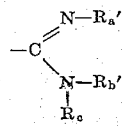

in which $R_a'$ is hydrogen, lower alkyl or hydroxyl, $R_b'$ is hydrogen, lower alkyl, or, when taken together with $R_a'$, lower alkylene separating the two nitrogen atoms by at least two, preferably by two to three, carbon atoms, and $R_c$ is hydrogen or lower alkyl, and in which one of the ring-carbon atoms of the piperidine nucleus, especially the ring-carbon atom representing the 3-position thereof, is substituted by a benzhydryl group of the formula

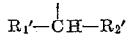

in which each of the groups $R_1'$ and $R_2'$ is phenyl, (lower alkyl-phenyl, (lower alkoxy)-phenyl (halogeno)-phenyl, or acid addition salts thereof. These compounds are represented by the following formula

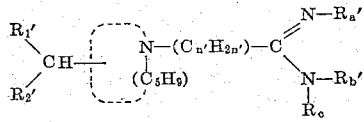

in which each of the groups $R_1'$, $R_2'$, $R_a'$, $R_b'$ and $R_c$ have the previously given meaning, the group of the formula $-(C_5H_9)-$ is a 1,5-pentylene radical, in which one of the carbon atoms, particularly the second carbon atom, is substituted by the group of the formula

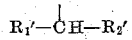

and the group of the formula $-(C_n \cdot H_{2n'})-$ is alkylene having from one to three carbon atoms and separating the carbon atom of the amidino moiety from the ring-nitrogen by one to two carbon atoms, or acid addition salts thereof.

Preferred compounds are the 1-(R''-lower alkyl)-piperidines, in which R'' is a hydroxy-amidino group, an amidino group or a 1,3-diaza-2-cycloalk-2-enyl group having from five to six ring members, and in which the 3-position is substituted by the group of the formula

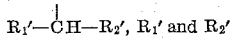

having the previously given meaning, or acid addition salts thereof; these compounds are represented by those of the formula

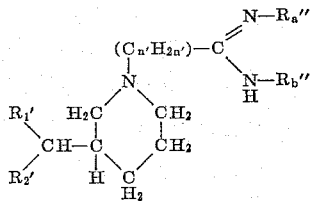

in which $R_1'$, $R_2'$ and the group of the formula

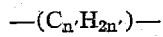

have the previously given meaning, $R_a''$ is hydrogen or hydroxyl, and $R_b''$ is hydrogen, or, when taken together with $R_a''$, lower alkylene having from two to three carbon atoms and separating the two nitrogen atoms by two to three carbon atoms, or acid addition salts thereof.

The compounds of this invention are useful in the form of compositions suitable for enteral, e.g. oral, or parenteral use, consisting essentially of a pharmacologically effective amount of one of the new compounds of this invention, or the pharmaceutically acceptable acid addition salts thereof, in admixture with a pharmaceutically acceptable, organic or inorganic, solid or liquid carrier, which usually represents the major portion by weight of such compositions. These preparations are in solid form, for example, as capsules, tablets, dragees and the like, or in liquid form, for example, as solutions, suspensions, emulsions and the like. Suitable carrier materials are, for example, starches, e.g. corn starch, wheat starch, rice starch and the like, sugars, e.g. lactose, sucrose and the like, stearic acid or salts thereof, e.g. magnesium stearate, calcium stearate and the like, stearyl alcohol, talc, gums, acacia, tragacanth, polyalkylene glycols, propylene glycol and the like. The quantity and the nature of the carrier ingredients may vary widely and depend, inter alia, upon the desired physical appearance or size of the composition, method of manufacture and the like. Encapsulation may be effected by using, if desired, the same excipients as those used for tablets. If necessary, the compositions having as the effective pharmacological ingredient one of the compounds of this invention, may contain other auxiliary substances, such as preserving, stabilizing wetting, emulsifying agents and the like, salts for varying the osmotic pressure, buffers, etc. They may also contain, in combination, other useful substances. The compounding of the formulations is generally carried out in the manner normally employed in the art, i.e. by manufacturing a mixture, a granulate and the like. Any compatible color, approved and certified under the provisions of the Federal Food, Drug and Cosmetic Law may be used for aesthetic purposes or as a means of identification.

The new compounds of this invention are prepared according to known methods, for example, by converting in an N-($R_0$-lower alkyl)-N,N-alkylene-imine, in which $R_0$ is a substituent capable of being converted into the group R having the previously given meaning, and in which the N,N-alkylene-imine portion has from five to eight ring members, and one of its ring-carbon atoms is substituted by the group of the formula

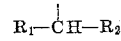

in which $R_1$ and $R_2$ have the previously-given meaning, or a salt thereof, the substituent $R_0$ into the group R, and, if desired, converting in a resulting compound the group R into another group R, and/or, if desired, converting a resulting salt into the free compound or into another salt, and/or, if desired, converting a free compound into a salt thereof, and/or, if desired, separating a resulting mixture of isomers into the single isomers.

Depending on the nature of the group R in the desired product, the conversion of a group $R_0$ into group R is carried out according to different procedures, which may also be performed stepwise.

Useful as starting materials in the above procedure are N-(reactive functionally converted carboxy-lower alkyl)-N,N-alkylene-imines, in which the N,N-alkylene-imine portion has the previously-given meaning, and one of its ring-carbon atoms is substituted as indicated, and in which the reactive functionally converted carboxy group is a cyano, an imido-ether, an imido-thioether, an imidohalide, an amido, a thioamido, an ester, or an acid halide grouping. These groups are represented by the formulae

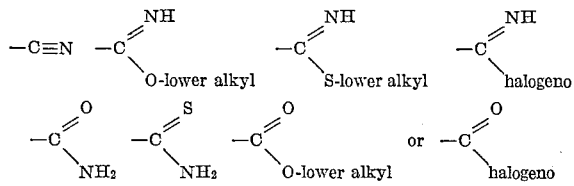

in which halogeno stands primarily for chloro, as well as bromo and the like, or their N-lower alkyl substituted analogs.

Conversion of a reactive functionally converted carboxyl group into a group having the amidino moiety is carried out according to known methods. For example, an amidino group of the formula

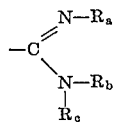

in which $R_a$ is hydrogen, and each of the groups $R_b$ and $R_c$ is hydrogen or lower alkyl, may be formed, by reacting a starting material, in which $R_o$ is a cyano group with ammonia or salts thereof, such as ammonium chloride, ammonium thiocyanate and the like (if necessary, in the presence of catalysts, e.g., aluminum chloride and the like), or with an N-lower alkyl-amine or an N,N-di-lower alkylamines, as well as salts thereof, for example, those with sulfonic acids. Compounds having the above amidino group are also obtained by reacting a starting material having as the group $R_o$ an imido-ether or, preferably, an imido-thioether group, or an acid addition salt thereof, with ammonia or a salt thereof, e.g., ammonium chloride and the like, or with an N-lower alkyl-amine or an N,N-di-lower alkyl-amine.

The conversion of a reactive functionally converted carboxyl group $R_o$ into a hydroxy-amidino group, i.e., the group of the formula

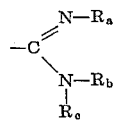

in which $R_a$ is hydroxyl or acyloxy, and each of the groups $R_b$ and $R_c$ is primarily hydrogen, as well as lower alkyl, is carried out according to known methods, for example, by reacting a starting material, in which $R_o$ is especially a cyano group, as well as any of the other nitrogen-containing functionally converted carboxyl groups, with hydroxylamine or a salt thereof, as well as an O-acyl-hydroxylamine. The conversion of such starting material into a product having a hydroxyamidino group is preferably carried out in the presence of a base, for example, an alkali metal lower alkoxide and the like.

Compounds, in which the two nitrogen atoms of the amidino moiety are linked together with a lower alkylene radical separating them by at least two carbon atoms, and form, together with the carbon atom of the amidino portion and the lower alkylene radical, a 1,3-diaza-2-cycloalk-2-enyl radical, i.e., a group of the formula

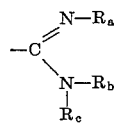

in which the groups $R_a$ and $R_b$ are taken together and represent a lower alkylene radical separating the two nitrogen atoms by at least two carbon atoms, and $R_c$ is hydrogen or lower alkyl, are prepared according to known methods, for example, by reacting the above starting material, in which $R_o$ has the previously-given meaning and is above all cyano, but may also be an amidino group, with a lower alkylene diamine, in which the two amino groups are separated by at least two carbon atoms, or a salt thereof, or with a compound capable of being converted into such lower alkylene diamine by treatment with ammonia, or with a reactive N-substituted derivative of such lower alkylene diamine, if necessary in the presence of a suitable reagent. For example, a starting material, in which the group $R_o$ is a cyano group, the reaction with the lower alkylene diamine or with a derivative thereof is performed in the presence of hydrogen sulfide, carbon disulfide and the like.

Compounds capable of being converted into a lower alkylene diamine by the reaction with ammonia, are, for example, the corresponding hydroxy-lower alkylamines, or especially the esters thereof, as well as lower alkylene halides. Using these starting materials, the reaction is carried out in the presence of ammonia or an agent yielding ammonia.

Reactive N-substituted derivatives of the lower alkylene diamine reagents are ureas, such as, for example, ethylene urea, propylene urea and the like.

The starting materials used in the above procedure are prepared according to known methods. For example, an N,N-alkylene-imine compound, in which alkylene has the previously given meaning, and one of its carbon atoms is substituted as shown before, or a salt thereof (for example, an alkali metal salt thereof), may be treated with a reactive esterified hydroxy-lower alkanoic acid or a functional acid derivative thereof; in a resulting compound, the carboxyl group or a functionally converted carboxyl group may be converted into the desired reactive functionally converted carboxyl group according to known methods. Furthermore, the above N,N-alkylene-imine intermediate may be treated with a reactive functional derivative of a lower alkenoic acid, particularly of acrylic acid, in which the double bond is activated by the functionally converted carboxyl group in such manner that the N,N-alkyleneimine adds to the double bond; this reaction is preferably carried out in the presence of a suitable base. Again, the functionally converted carboxyl group in a resulting starting material may be converted into another functionally converted carboxyl group. Furthermore, starting materials, in which the functionally converted carboxyl group is separated from the imino-nitrogen by one carbon atom only, may also be prepared by reacting the above N,N-alkylene-imine intermediate with a lower alkanal (particularly formaldehyde) in the presence of hydrocyanic acid or a salt thereof according to the Strecker synthesis, and, if desired, the cyano group in the resulting starting material may be converted into another functionally converted carboxyl group.

The compounds of this invention may also be prepared, for example, by reacting an N,N-alkylene-imine, in which N,N-alkylene-imino has the previously given meaning, and one of its ring-carbon atoms is substituted as shown before, or a salt thereof, with a reactive ester of an R-lower alkanol, in which R has the previously given meaning, or a salt thereof, and, if desired, carrying out the optional steps.

A salt of the N,N-alkylene-imine starting material is particularly a metal salt, especially an alkali metal salt, which is prepared by reacting the N,N-alkylene-imine starting material with an alkali metal hydride or amide or any other suitable salt-forming reagent, and may also be formed in situ by reacting the starting material with the reactive ester of the R-lower alkanol in the presence of a salt-forming reagent.

Particularly useful as reactive esters of R-lower alkanols are the R-lower alkyl halides (i.e., esters with hydrohalic acids), particularly the chlorides, in which R has the previously given meaning, but is above all a group of the formula

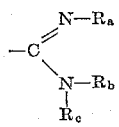

in which $R_a$ and $R_b$ are taken together to form a lower alkylene radical separating the two nitrogen atoms by at least two carbon atoms, and $R_c$ is hydrogen or lower alkyl.

The reaction of the starting material with the reactive ester of an R-lower alkanol is carried out according to known methods, preferably in the presence of a diluent, and, if necessary, at an elevated temperature.

As mentioned before, the group R in a resulting compound may be converted into another group R. For example, a resulting compound in which the group R represents a hydroxy-amidino group may be converted into an N-(R-lower alkyl)-N,N-alkylene-imine compound, in which R is an amidinio group in which the imino-nitrogen is unsubstituted. Such conversion is achieved, for example, by treatment of an N-(hydroxy-amidino-lower alkyl)-N,N-alkylene-amine, in which N,N-alkylene-imino has the previously given meaning, and one of its ring-carbon atoms is substituted as shown above, with a reducing reagent, preferably with hydrogen in the presence of a catalyst containing a metal of the eighth group of the periodic system, for example, rhodium and the like. The preferred catalyst is rhodium on charcoal; treatment with hydrogen is carried out under atmospheric or, preferably, under increased pressure, and in the presence of a suitable diluent.

Furthermore, the amino group or the hydroxyl group in a resulting N-(R-lower alkyl)-N,N-alkylene-imine, R being a substituent having the amidino moiety in which the imino nitrogen is substituted by hydroxyl or in which the amino group carries a hydrogen, may be acylated according to known methods, for example, by treatment with a reactive functional derivative of an organic carboxylic acid, such as the halide, particularly the chloride and the like, or the anhydride thereof.

In a resulting N-(R-lower alkyl)-N,N-alkylene-imine, in which R is above all a 1,3-diaza-2-cycloalk-2-ene substituent, as well as any other substituent having a suitabe amidino moiety, a hydrogen attached to a nitrogen of the amidino moiety, may be replaced by lower alkyl according to known methods, for example, by treating such compound, if necessary, an alkali metal salt thereof, with a reactive ester of a lower alkanol, such as a lower alkyl halide, e.g. chloride, bromide, iodide and the like.

Depending on the procedure used, the new compounds are obtained in the form of the free base or a salt thereof. A resulting salt may be converted into the free base, for example, by treatment with an alkaline agent, such as a metal hydroxide, e.g. sodium hydroxide, potassium hydroxide and the like, a metal carbonate, e.g. sodium or potassium carbonate or hydrogen carbonate and the like, ammonia or any other alkaline reagent, such as a suitable hydroxyl ion exchange preparation, etc.

A resulting salt may be converted into another salt; for example, a salt with an inorganic acid may be reacted with a suitable metal, e.g. sodium, barium, silver and the like, salt of an acid, in the presence of a diluent, in which the resulting inorganic salt is insoluble and thus removed from the reaction. The conversion into another salt may also be accomplished by treatment with a suitable anion exchange preparation.

A free compound may be converted into an acid addition salt thereof by reacting it or a solution thereof in a suitable solvent or solvent mixture, with an acid, such as one of those described before, or a solution thereof, or with a suitable anion exchange preparation, and isolating the desired salt. A salt may be obtained in the form of its hydrates or may contain solvent of crystallization.

A resulting mixture of isomeric compounds may be separated into the single isomers according to known methods. For example, a racemate may be resolved into the optically active forms, the levo-rotatory l-form and the dextro-rotatory d-form according to known resolution methods. For example, to the solution of the free base of a racemate (a d, l-compound) in a suitable solvent or solvent mixture is added one of the optically active forms of an acid, containing an asymmetric carbon atom, or a solution thereof. Especially useful as optically active forms of salt-forming acids, having the asymmetric carbon atom are the d-tartaric acid (L-tartaric acid) and the l-tartaric acid (D-tartaric acid); the optically active forms of di-benzoyl-tartaric, di-p-toluyl-tartaric, malic, mandelic, 10-camphor sulfonic, quinic acid and the like, may also be used. A resulting mixture of salts may then be separated on the basis of physico-chemical differences, e.g. different solubilities and the like. The free and optically active base may be obtained from the resulting salt according to the methods described above, and an optically active base may be converted into its acid addition salt as described hereinbefore.

The invention also comprises any modification of the process wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 12.5 g. of 3-benzhydryl-piperidine and 3.8 g. of 2-chloromethyl-2-imidazoline in 30 ml. of ethanol is refluxed for five hours, and is then allowed to stand at room temperature for 2½ days. After evaporating the solvent under reduced pressure, the residue is dissolved in 75 ml. of water; an aqueous solution of sodium hydrogen carbonate and diethyl ether are added. Of the three layers formed, the aqueous bottom layer, containing a small amount of 3-benzhydryl-piperidine, is discarded. The intermediate phase is separated and partitioned between water and ethyl acetate; the aqueous solution is made strongly alkaline with sodium hydroxide and is again extracted with ethyl acetate. The ethyl acetate extract is washed with water, dried and concentrated under reduced pressure. The residue (yield: 6.0 g.) is dissolved in ethyl acetate, and the organic solution is treated with a concentrated solution of hydrogen chloride in ethyl acetate. The desired 2-[(3-benzhydryl-piperidino)-methyl]-imidazoline dihydrochloride of the formula

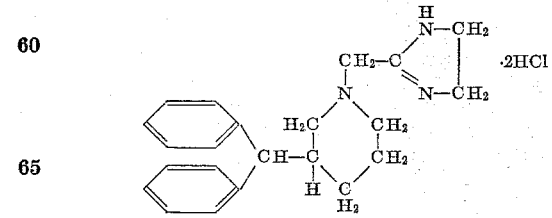

precipitates, is filtered off and treated with a small amount of isopropanol. A small amount of insoluble material is filtered off, and the filtrate is diluted with ethyl acetate and diethyl ether to yield crystalline salt, which melts at 238–242°.

A mixture of 1.0 g. of 2-[(3-benzhydryl-piperidino)-methyl]-imidazoline in 10 ml. of ethanol, containing 1.0 g. of methyl iodide is allowed to stand at room temperature for four days and is then concentrated under reduced pressure. The residue is crystallized by adding acetone to yield the desired 2-[(3-benzhydryl-piperidino)-methyl]-1-methyl-imidazoline hydriodide of the formula

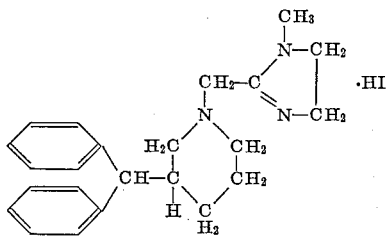

Other compounds prepared according to the above procedure by selecting the appropriate starting materials are, for example:

The starting material used in the above procedure is prepared as follows: A mixture of 3-benzhydryl-piperidine, 11.8 g. of chloroacetonitrile and 42 g. of sodium carbonate in 150 ml. of toluene and 3.5 g. of water is refluxed for twenty hours while stirring. The hot solution is filtered, the residue is washed with hot benzene, and the combined filtrates are evaporated under reduced pressure. The residual oil is triturated with diethyl ether and yields the crystalline 3-benzhydryl-1-cyanomethyl-piperidine, M.P. 120–122° (with decomposition).

On treatment of a solution of 3-benzhydryl-1-hydroxy-amidino-methyl-piperidine in diethyl ether with a solution of a slight excess of benzoyl chloride in diethyl ether, the 3-benzhydryl-1-(benzoyloxy-amidino-methyl)-piperidine hydrochloride is formed.

Other compounds of the above type are prepared according to the previously-described method by selecting the appropriate starting materials:

| N,N-alkylene-imine starting material | Reagent | N-(R-lower alkyl)-N,N-alkylene-imine product |
|---|---|---|
| 4-benzhydryl-piperidine | 2-chloromethyl-2-imidazoline | 2-[(4-benzhydryl-piperidino)-methyl]-2-imidazoline. |
| 3-di-(4-methyl-phenyl)-methyl-piperidine. | do | 2-{[3-di-(4-methyl-phenyl)-methyl-piperidino]-methyl}-2-imidazoline. |
| 3-[α-(4-chloro-phenyl)-benzyl]-piperidine. | do | 2-{{(3-[α-(4-chloro-phenyl)-benzyl]-piperidino)-methyl}}-2-imidazoline. |
| 3-di-(4-chloro-phenyl)-methyl-piperidine. | do | 2-{[3-di-(4-chloro-phenyl)-methyl-piperidino]-methyl}-2-imidazoline. |
| 3-di-(4-methoxy-phenyl)-methyl-piperidine. | do | 2-{[3-di-(4-methoxy-phenyl)-methyl-piperidino]-methyl}-2-imidazoline. |
| 3-benzhydryl-piperidine | 2-chloromethyl-4-methyl-imidazoline | 2-[(3-benzhydryl-piperidino)-methyl]-4-methyl-2-imidazoline. |
| Do | 2-chloromethyl-1,4,5,6-tetra-hydro-pyrimidine. | 2-[(3-benzhydryl-piperidino)-methyl]-1,4,5,6-tetrahydro-pyrimidine. |
| Do | 2-(3-chloro-propyl)-2-imidazoline | 2-[3-(3-benzhydryl-piperidino)-propyl]-2-imidazoline. |
| 3-benzhydryl-pyrrolidine | 2-chloromethyl-2-imidazoline | 2-[(2-benzhydryl-pyrrolidino)-methyl]-2-imidazoline. |

*Example 2*

To a solution of 1.4 g. of hydroxylamine hydrochloride

| N-(cyano-lower alkyl)-N,N-alkylene-imine starting material | Reagent | N-(R-lower alkyl)-N,N-alkylene-imine product |
|---|---|---|
| 4-benzhydryl-1-cyanomethyl-piperidine | Hydroxylamine hydrochloride plus sodium ethoxide. | 4-benzhydryl-1-hydroxyamidino-methyl-piperidine. |
| 3-benzhydryl-1-(2-cyanoethyl)-piperidine | do | 3-benzhydryl-1-(2-hydroxy-amidino-ethyl)-piperidine. |
| 1-(2-cyanoethyl)-3-di-(4-methyl-phenyl)-methyl-piperidine. | do | 1-(2-hydroxyamidino-ethyl)-3-di-(4-methyl-phenyl)-methyl-piperidine. |
| 3-[α-(4-chloro-phenyl)-benzyl]-1-cyano-methyl-piperidine. | do | 3-[α-(4-chloro-phenyl)-benzyl]-1-hydroxyamidino-methyl-piperidine. |
| 3-di-(4-chloro-phenyl)-methyl-1-(2-cyano-ethyl)-piperidine. | do | 3-di-(4-chloro-phenyl)-methyl-1-(2-hydroxyamidino-ethyl)-piperidine. |
| 3-di-(4-methoxy-phenyl)-methyl-1-(2-cyanoethyl)-piperidine. | do | 1-(2-hydroxyamidino-ethyl)-3-di-(4-methoxy-phenyl)-methyl-piperidine. |
| 3-benzhydryl-1-cyanomethyl-pyrrolidine | do | 3-benzhydryl-1-hydroxyamidino-methyl-pyrrolidine. | in 30 ml. of anhydrous ethanol are added while stirring, 5.8 g. of 3-benzhydryl-1-cyanomethyl-piperidine and then slowly a solution of 0.5 g. of sodium in 20 ml. of anhydrous ethanol. The reaction mixture is refluxed for three hours and is then allowed to stand at room temperature for 72 hours and filtered. The filtrate is concentrated under reduced pressure, and the residue, containing the 3-benzhydryl-1-hydroxy-amidino-methyl-piperidine of the formula

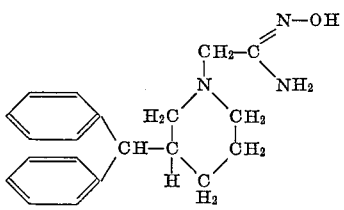

is dissolved in anhydrous ethanol and treated with gaseous hydrogen chloride to yield the 3-benzhydryl-1-hydroxy-amidino-methyl-piperidine dihydrochloride.

*Example 3*

A mixture of 6.5 g. of 3-benzhydryl-1-hydroxyamidino-methyl-piperidine and 2 g. of a rhodium catalyst (rhodium on charcoal) in 50 ml. of anhydrous ethanol is treated while shaking and maintaining room temperature, with hydrogen at a pressure of about 3½ atmospheres. After the up-take of the theoretical amount of hydrogen, the reaction is interrupted and the catalyst is filtered off. The filtrate is allowed to run into a cold solution of hydrogen bromide in ethanol; the resulting precipitate is filtered off and recrystallized to yield the desired 1-amidinomethyl-3-benzhydryl-piperidine dihydrobromide of the formula

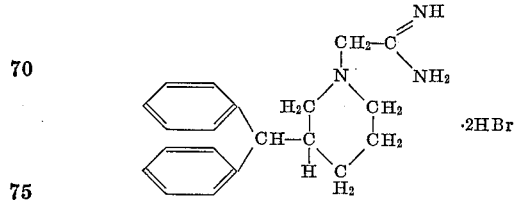

Other N-(R-lower alkyl)-N,N - alkylene - amine compounds of this invention, in which R is an amidino group, are prepared according to the above procedure by selecting the appropriate starting materials:

| N-(hydroxyamidino-lower alkyl)-N,N-alkylene-imine starting material | Reducing Reagent | N-(R-lower alkyl)-N,N-alkylene-imine product |
| --- | --- | --- |
| 4-benzhydryl-1-hydroxyamidino-methyl | Hydrogen+Rh/C | 1-amidinomethyl-4-benzhydrylpiperidine. |
| 3-benzhydryl-1-(2-hydroxyamidino-ethyl)-piperidine. | do | 1-(2-amidino-ethyl)-3-benzhydryl-piperidine. |
| 1-(2-hydroxyamidino-ethyl)-3-di(4-methyl-phenyl)-methyl-piperidine. | do | 1-(2-amidino-ethyl)-3-di-(4-methyl-phenyl)-piperidine. |
| 3-[α-(4-chlorophenyl)-benzyl]-1-hydroxyamidino-methyl-piperidine. | do | 1-amidinomethyl-3-[α-(4-chloro-phenyl)-benzyl]-piperidine. |
| 3-di(4-chlorophenyl)-methyl-1-(2-hydroxyamidino-ethyl)-piperidine. | do | 1-(2-amidino-ethyl)-3-di-(4-chloro-phenyl)-methyl-piperidine. |
| 1-(2-hydroxyamidino-ethyl)-3-di-(4-methoxy-phenyl)-methyl-piperidine. | do | 1-amidinomethyl-3-di-(4-methoxy-phenyl)-methyl-piperidine. |
| 3-benzhydryl-1-hydroxyamidino-methyl-pyrrolidine. | do | 1-amidinomethyl-3-benzhydryl-pyrrolidine. |

*Example 4*

To a cold 10 percent solution of a large excess of dry methylamine in anhydrous ethanol is added 5.1 g. of ethyl 3-(3-benzhydryl-piperidino) - propionthioimidate dihydrobromide; the reaction mixture is shaken at room temperature in a closed vessel for two days, and is then diluted with hexane. The resulting precipitate is filtered off, and the desired 1-[2-(N-methyl-amidino)ethyl]-3-benzhydryl-piperidine dihydrobromide of the formula

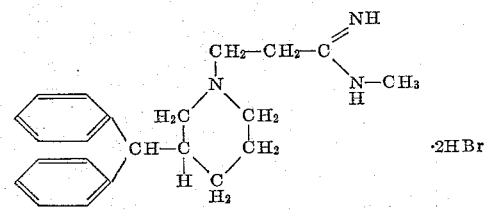

is filtered off and purified by recrystallization.

The starting material used in the above procedure is prepared as follows: A cold mixture of 15.2 g. of 3-benzhydryl-1-(2-cyano-ethyl)-piperidine and 4.0 g. of ethyl-mercaptan in 75 ml. of chloroform is treated with gaseous hydrogen bromide. After thirty minutes, the reaction is interrupted; the reaction mixture is allowed to stand overnight while cooling, and the resulting precipitate is filtered off. The desired ethyl 3-(3-benzhydryl-piperidino)-pro-prothioimidate dihydrobromide is purified by recrystallization.

What is claimed is:
1. A member selected from the group consisting of a compound of the formula

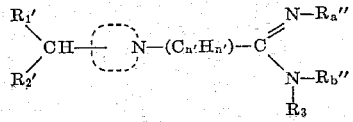

in which the group of the formula

is N,N-alkylene-imino having 5 to 6 ring members, each of the groups $R_1'$ and $R_2'$ is a member selected from the group consisting of phenyl, (lower alkyl)-phenyl, (lower alkoxy)-phenyl and (halogeno)-phenyl, the group of the formual $—(C_{n'}H_{2n'})—$ is alkylene having from one to three carbon atoms and separating the carbon atom of the amidino moiety from the ring-nitrogen by one to two carbon atoms, $R_a''$ is a member selected from the group consisting of hydrogen and hydroxyl, and $R_b''$ is a member selected from the group consisting of hydrogen and, when taken together with $R_a''$, lower alkylene having from two to three carbon atoms and separating the two nitrogen atoms by two to three carbon atoms $R_3$ is a member selected from the group consisting of hydrogen and lower alkyl, and acid addition salts thereof.

2. 2-[(3-benzhydryl-piperidino)-methyl]-imidazoline.
3. An acid addition salt of 2-[(3-benzhydryl-piperidino-methyl]-imidazoline.
4. 2-[(3-benzhydryl-pipiperidino) - methyl] - imidazoline dihydrochloride.
5. 3-benzhydryl-1-hydroxyamidino-methyl-piperidine.
6. An acid addition salt of 3-benzhydryl-1-hydroxyamidino-methyl-piperidine.
7. 1-amidinomethyl-3-benzhydryl-piperidine.
8. An acid addition salt of 1-amidinomethyl-3-benzhydryl-piperidine.

References Cited by the Examiner
UNITED STATES PATENTS

| | | | |
| --- | --- | --- | --- |
| 2,947,782 | 8/1961 | DeBenneville | 260—293 |
| 3,081,303 | 4/1963 | Rorig | 260—293 |
| 3,189,601 | 6/1965 | Mull | 260—293 |
| 3,252,982 | 5/1966 | Mizzoni et al. | 260—293 |
| 3,252,983 | 5/1966 | Mizzoni et al. | 260—293 |

WALTER A. MODANCE, *Primary Examiner.*

AVROM D. SPEVACK, *Assistant Examiner.*

UNITED STATES PATENT OFFICE
CERTIFICATE OF CORRECTION

Patent No. 3,304,306                  February 14, 1967

Lincoln Harvey Werner et al.

It is hereby certified that error appears in the above numbered patent requiring correction and that the said Letters Patent should read as corrected below.

Column 12, line 24, for "formual" read -- formula --; line 37, for "dino-methyl" read -- dino)-methyl --.

Signed and sealed this 21st day of November 1967.

(SEAL)
Attest:

Edward M. Fletcher, Jr.                   EDWARD J. BRENNER
Attesting Officer                        Commissioner of Patents